United States Patent [19]

Beck et al.

[11] Patent Number: 5,250,484
[45] Date of Patent: Oct. 5, 1993

[54] SURFACE MODIFIED POROUS ACIDIC CRYSTALLINE CATALYST

[75] Inventors: Jeffrey S. Beck, Lawrenceville; Roland H. Heck, Pennington, both of N.J.; Jose G. Santiesteban, Yardley, Pa.

[73] Assignee: Mobil Oil Corporation, Fairfax, Va.

[21] Appl. No.: 798,485

[22] Filed: Nov. 26, 1991

[51] Int. Cl.⁵ .................. B01J 29/28; B01J 37/00
[52] U.S. Cl. ........................ 502/71; 502/60; 502/64
[58] Field of Search ............. 502/60, 86, 64, 71; 501/49

[56] References Cited

U.S. PATENT DOCUMENTS

| | | | |
|---|---|---|---|
| 3,493,518 | 2/1970 | Jonassen et al. | 502/86 |
| 4,300,012 | 11/1981 | Tu et al. | 585/470 |
| 4,520,221 | 5/1985 | Chen | 585/517 |
| 4,568,786 | 2/1986 | Chen et al. | 585/517 |
| 4,613,720 | 9/1986 | Bonifaz et al. | 585/640 |
| 4,752,596 | 6/1988 | Bergna et al. | 502/64 |
| 4,806,512 | 2/1989 | Elvin | 502/65 |
| 4,870,038 | 9/1989 | Page et al. | 502/62 |
| 4,906,599 | 3/1990 | Cody et al. | 502/86 |
| 5,012,029 | 4/1991 | Han et al. | 585/500 |
| 5,021,371 | 6/1991 | Mignani et al. | 501/49 |
| 5,120,692 | 6/1992 | Beck | 502/60 |

Primary Examiner—Carl F. Dees
Attorney, Agent, or Firm—Alexander J. McKillop; Dennis P. Santini; Laurence P. Hobbes

[57] ABSTRACT

A surface-inactivated catalyst composition comprising acidic porous crystalline material, e.g., ZSM-23, having active internal Brönsted acid sites and containing surface-inactivating material having a boron to nitrogen bond is prepared by contacting the surface with aqueous ammonia borane solution. The catalyst may be used for organic compound conversion, e.g., oligomerization of lower olefins to produce distillate boiling range materials having reduced methyl branching and increased cetane number.

5 Claims, 1 Drawing Sheet

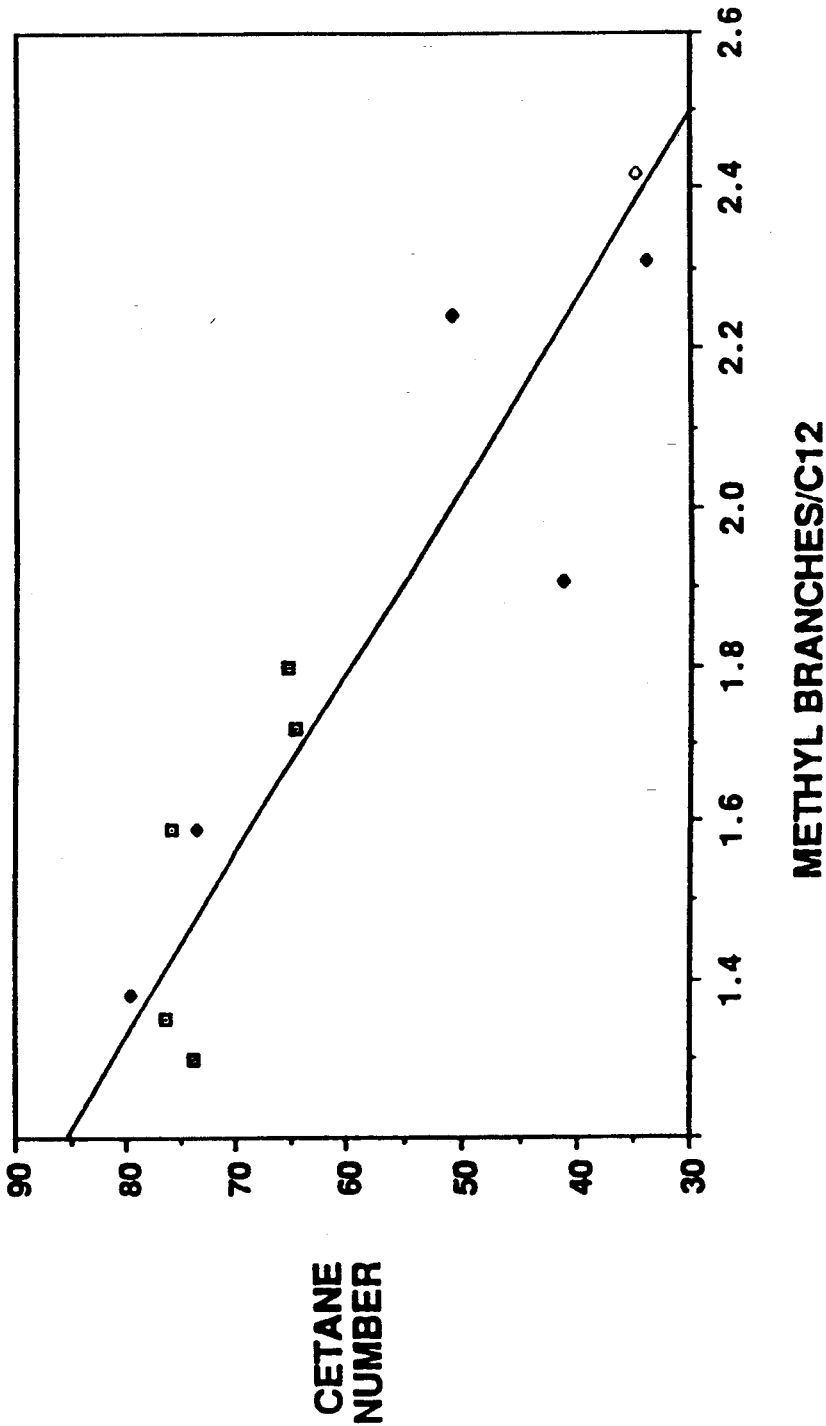
FIGURE
Cetane Number of 450-650°F Diesel cut vs. Methyls/C12 for Propylene Oligomers

SURFACE MODIFIED POROUS ACIDIC CRYSTALLINE CATALYST

BACKGROUND

This application discloses an acidic crystalline catalyst which is surface inactivated by exposure to aqueous ammonia borane solution. The application further discloses uses for such catalysts, including a process for producing high molecular weight hydrocarbons from a lower olefin feedstock.

Recent work in the field of olefin upgrading has resulted in a catalytic process for converting lower olefins to heavier hydrocarbons. Heavy distillate and lubricant range hydrocarbons can be synthesized over ZSM-5 type catalysts at elevated temperature and pressure to provide a product having substantially linear molecular conformations due to the shape selectivity of certain medium pore catalysts.

Conversion of olefins to gasoline and/or distillate products is disclosed in U.S. Pat. Nos. 3,960,978 and 4,021,502 (Givens, Plank and Rosinski) wherein gaseous olefins in the range of ethylene to pentene, either alone or in admixture with paraffins are converted into an olefinic gasoline blending stock by contacting the olefins with a catalyst bed made up of a ZSM-5 type zeolite. Such a technique has been developed by Garwood, et al, as disclosed in European Patent Application No. 83301391.5, published Sept. 29, 1983. In U.S. Pat. Nos. 4,150,062; 4,211,640; 4,227,992; and 4,547,613 Garwood, et al disclose operating conditions for a process for selective conversion of $C_3^+$ olefins to mainly aliphatic hydrocarbons.

In the process for catalytic conversion of olefins to heavier hydrocarbons by catalytic oligomerization using a medium pore shape selective acid crystalline zeolite, process conditions can be varied to favor the formation of hydrocarbons of varying molecular weight. At moderate temperature and relatively high pressure, the conversion conditions favor $C_{10}^+$ aliphatic product. Lower olefinic feedstocks containing $C_2$-$C_8$ alkenes may be converted; however, the distillate mode conditions do not convert a major fraction of ethylene. A typical reactive feedstock consists essentially of $C_3$-$C_6$ mono-olefins, with varying amounts of non-reactive paraffins and the like being acceptable components.

Several techniques may be used to increase the relative ratio of intra-crystalline acid sites to surface active sites in acidic porous crystalline materials. This ratio tends to increase with crystal size due to geometric relationship between volume and superficial surface area. Deposition of carbonaceous materials by coke formation can also shift the effective ratio, as disclosed in U.S. Pat. No. 4,547,613.

It is known to use certain basic materials to deactivate the Brönsted acid sites on the surface of aluminosilicate catalysts. U.S. Pat. No. 4,520,221 and U.S. Pat. No. 4,568,786, Chen, et al., which are expressly incorporated herein disclose bulky amines, such as di-tert-butyl pyridine, as such basic materials.

U.S. Pat. No. 4,870,038 to Page et al. discloses olefin oligomerization using a zeolitic catalyst (ZSM-23) wherein the zeolite surface is rendered substantially inactive for acidic reactions by neutralizing with a bulky pyridine compound, e.g., 2,4,6-collidine.

U.S. Pat. No. 5,012,029 to Han et al. discloses a method for the selective oxidation of methane to liquid hydrocarbons over zeolitic catalyst, e.g., ZSM-5 or ZSM-23, by introducing a reaction modifier, e.g., borane (column 8, line 34), to the feed, which reduces selectivity to methanol.

U.S. Pat. No. 4,300,012 to Tu et al. discloses an alkylaromatic transalkylation catalyst whose selectivity is enhanced by treating a mordenite alumina with an aqueous ammoniacal solution, calcining, and then contacting with an aqueous solution containing a boron salt.

U.S. Pat. No. 4,613,720 to Kukes et al. teaches olefin oligomerization to $C_5$ to $C_{12}$ hydrocarbons over aluminosilicates having a silica to alumina ratio of less than 12 which is prepared by depositing a boron containing species on the surface region. Boranes are disclosed as a source of suitable boron containing species. The addition of boron reduces the formation of coke on the surface region of the catalyst at low exposures and enhances yields of light monoolefins.

U.S. Pat. No. 4,752,596 to Bergna et al. discloses an acidic zeolite such as chabazite, erionite, ZK-5 or rho which is used in the production of dimethylamine from methanol and ammonia. The zeolite is modified by treatment with, inter alia, boron compounds, e.g. boranes (column 13, line 27).

U.S. Pat. No. 4,806,512 to Elvin teaches the treatment of crystalline materials such as zeolites with an aqueous reductive wash medium, e.g., borane, followed by treatment with an oxidative wash medium in order to improve catalytic properties.

Shape-selective oligomerization, as it applies to the conversion of $C_2$-$C_{10}$ olefins over ZSM-5, may produce higher olefins up to $C_{30}$ and higher. As reported by Garwood in "Intrazeolite Chemistry 23", (Amer. Chem. Soc., 1983), reaction conditions favoring higher molecular weight product are low temperature (200°-260° C.), elevated pressure (about 2000 kPa or greater), and long contact time (less than 1 WHSV). The reaction under these conditions proceeds through the acid-catalyzed steps of (1) oligomerization, (2) isomerization-cracking to a mixture of intermediate carbon number olefins, and (3) interpolymerization to give a continuous boiling product containing all carbon numbers. The channel systems of medium pore catalysts impose shape-selective constraints on the configuration of the large molecules, accounting for the differences with other catalysts.

The desired oligomerization-polymerization products include $C_{10}^+$ substantially linear aliphatic hydrocarbons. This catalytic path for propylene feed provides a long chain which generally has lower alkyl (e.g., methyl) substituents along the straight chain.

The final molecular configuration is influenced by the pore structure of the catalyst. For the higher carbon numbers, the structure is primarily a methyl-branched straight olefinic chain, with the maximum cross-section of the chain limited by the dimension of the largest zeolite pore. Although emphasis is placed on the normal 1-alkenes as feedstocks, other lower olefins, such as 2-butene or isobutylene, are readily employed as starting materials due to rapid isomerization over the acidic zeolite catalysts. At conditions chosen to maximize heavy distillate and lubricant range products ($C_{20}^+$), the raw aliphatic product is essentially mono-olefinic. Overall branching is not extensive and may occur at spaced positions within the molecule.

The viscosity index of a hydrocarbon lube oil is related to its molecular configuration. Extensive branching in a molecule usually results in a low viscosity index.

Similarly, extensive branching can be problematic in distillate fractions which are utilized as diesel fuels. Such branching increases auto ignition delay above optimal operating levels in diesel engines. Cetane number is a measurable quantity which varies inversely with the extent of branching in the components of a diesel fuel. It is believed that two modes of oligomerization/polymerization of olefins can take place over acidic zeolites, such as HZSM-5. One reaction sequence takes place at Brönsted acid sites inside the channels or pores, producing essentially linear materials. The other reaction sequence occurs on the outer surface, producing more branched material. By decreasing the surface acid activity of such zeolites, fewer highly branched products with low VI or low cetane number are obtained.

SUMMARY

The present invention relates to a surface-inactivated catalyst composition comprising acidic porous crystalline material having active internal Brönsted acid sites and containing surface-inactivating material having a boron to nitrogen bond. In another aspect, the present invention relates to a process of making a surface-inactivated acidic catalyst which comprises contacting acidic porous crystalline material with an aqueous solution of ammonia borane deactivating agent to effect deposition of said ammonia borane on the surface of the material; and exposing said material to conditions, e.g., heat, which convert said ammonia borane to a ceramic having a boron to nitrogen bond. In yet another aspect, the present invention relates to a process for effecting catalytic conversion of an organic charge which comprises contacting the charge under catalytic conversion conditions with a catalytically effective amount of surface-inactivated catalyst composition comprising acidic porous crystalline material having active internal Brönsted acid sites and containing surface-inactivating material having a boron to nitrogen bond.

BRIEF DESCRIPTION OF THE DRAWING

The FIGURE depicts Cetane Number of a 450°–650° F. Diesel cut versus Methyls/$C_{12}$ for propylene oligomers.

DETAILED DESCRIPTION OF THE INVENTION

The acidic porous crystalline materials which are used in preparing the surface-modified materials of the present invention can be molecular sieves including both natural and synthetic zeolites, and aluminophosphate materials (ALPO$_4$s), including silicoaluminophosphate materials (SAPOs) and metalloaluminophosphate materials (MAPOs) which are modified to impart acid activity thereto. Such materials are further discussed in U.S. Pat. Nos. 4,310,440; 4,500,651: and 4,503,023. Related materials also suited to such modification include those set out in U.S. Pat. No. 4,880,611, incorporated herein by reference in its entirety. This reference describes a composition of matter comprising crystals having a framework topology after heating at 110° C. or higher giving an X-ray diffraction pattern with interplanar d-spacings at 16.4±0.2 Angstroms, 8.2±0.1 Angstroms and 4.74±0.05 Angstroms, and without a significant interplanar d-spacing at 13.6–13.3 Angstroms. Such materials can include SAPOs or silicon-substituted aluminophosphates, which have a three dimensional crystal framework of suitable size may also be used as the required molecular sieve component in the shell of the present layered catalyst. U.S. Pat. No. 4,440,871 and U.S. Pat. No.4,741,892 and U.S. Pat. No. 4,689,138, which are incorporated herein by reference, disclose other silicoaluminophosphate molecular sieves suited to use in the present invention.

The acidic porous crystalline material can be a porous crystalline silicate, e.g., a shape selective porous crystalline silicate zeolite. Any zeolite having a Constraint Index of 1-12 can be used herein. Preferred shape selective zeolites are exemplified by ZSM-5, ZSM-11, ZSM-12, ZSM-22, ZSM-23, ZSM-35, and ZSM-48 and similar materials.

ZSM-5 is described in U.S. Pat. No. 3,702,886, U.S. Reissue 29,948 and in U.S. Pat. No. 4,061,724 (describing a high silica ZSM-5 as "silicalite").

ZSM-11 is described in U.S. Pat. No. 3,709,979.
ZSM-12 is described in U.S. Pat. No. 3,832,449.
ZSM-22 is described in U.S. Pat. No. 4,556,477.
ZSM-23 is described in U.S. Pat. No. 4,076,842.
ZSM-35 is described in U.S. Pat. No. 4,016,245.
ZSM-48 is described in U.S. Pat. No. 4,397,827.

These patents are incorporated herein by reference.

Zeolites in which some other framework element is present in partial or total substitution of aluminum can be advantageous. Elements which can be substituted for part of all of the framework aluminum are boron, gallium, zirconium, titanium and trivalent metals which are heavier than aluminum. Specific examples of such zeolites include ZSM-5 and zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

It is generally desirable to incorporate the acidic porous crystalline material with another material resistant to the temperatures and other conditions employed in organic conversion processes. Such matrix materials include active and inactive materials and synthetic or naturally occurring zeolites as well as inorganic materials such as clays, silica and/or metal oxides. The latter may be either naturally occurring or in the form of gelatinous precipitates, sols or gels including mixtures of silica and metal oxides. Use of a material in conjunction with the acidic porous crystalline material, i.e. combined therewith, which is active, tends to improve the conversion and/or selectivity of the catalyst in certain organic conversion processes. Inactive materials suitably serve as diluents to control the amount of conversion and/or selectivity of the catalyst in certain organic conversion processes. Frequently, zeolite materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the acidic porous crystalline material include the montmorillonite and kaolin family, which families include the sub-bentonites, and the kaolins commonly known as Dixie, McNamee, Georgia and Florida clays or others in which the main mineral constituents is halloysite, kaolinite, dickite, nacrite, or anauxite. Such clays can be used in the raw state as originally mined or initially subjected to calcination, acid treatment or chemical modification.

In addition to the foregoing materials, the acidic porous crystalline material catalyst can be composited with a porous matrix material such as silica, alumina, zirconia, titania, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used.

Of all the foregoing materials, silica is preferred as the matrix material where surface acidity is to be minimized, owing to its relative inertness for acid-catalyzed reactions. The relative proportions of finely divided acidic porous crystalline material, and inorganic oxide gel matrix vary widely with the acidic porous crystalline material content ranging from about 1 to about 90 percent by weight and more usually in the range of about 2 to about 50 percent by weight of the composite.

The acidic porous crystalline material of the present invention can be prepared by contacting the above-described acidic porous crystalline materials, preferably composited with a porous matrix material, with the $NH_3.BH_3$ molecular complex as an aqueous ammonia borane solution. The aqueous solution of ammonia borane deactivating material can have an $NH_3.BH_3$ aqueous molar concentration range of 0.005M to 10M, preferably 0.01M to 5M. The contacting occurs for a sufficient time to allow chemisorption of the aqueous ammonia borane on the surface of the acidic porous crystalline material, say, 1 to 100 minutes, preferably 5 to 60 minutes.

The thus-contacted material is thereafter exposed to conditions which effect conversion of ammonia borane to ceramic materials, e.g., polymers of (BNH) and BN. Such conditions include exposure to heat, e.g., temperatures of 50° to 700° C., preferably 200° to 538° C.

The catalyst composition of the present invention is useful as a catalyst component for a variety of organic, e.g., hydrocarbon, compound conversion processes. Such conversion processes include, as non-limiting examples, cracking hydrocarbons with reaction conditions including a temperature of from 300° C. to 700° C., a pressure of from 0.1 atmosphere (bar) to about 30 atmospheres and a weight hourly space velocity of from 0.1 $hr^{-1}$ to 20 $hr^{-1}$; dehydrogenating hydrocarbon compounds with reaction conditions including a temperature of from 300° C. to 700° C., a pressure of from 0.1 atmosphere (bar) to 10 atmospheres and a weight hourly space velocity of from 0.1 $hr^{-1}$ to 20 $hr^{-1}$; converting paraffins to aromatics with reaction conditions including a temperature of from 100° C. to 700° C., a pressure of from 0.1 atmosphere (bar) to 60 atmospheres and a weight hourly space velocity of from 0.5 $hr^{-1}$ to 400 $hr^{-1}$ and a hydrogen/hydrocarbon mole ratio of from 0 to 20; converting olefins to aromatics, e.g., benzene, toluene and xylenes, with reaction conditions including a temperature of from 100° C. to 700° C., a pressure of from 0.1 atmosphere (bar) to 60 atmospheres and a weight hourly space velocity of from 0.5 $hr^{-1}$ to 400 $hr^{-1}$ and a hydrogen/hydrocarbon mole ratio of from 0 to 20; converting alcohols, e.g., methanol, or ethers, e.g., dimethylether, or mixtures thereof to hydrocarbons including aromatics with reaction conditions including a temperature of from 300° C. to 550° C., more preferably from 370° C. to 500° C., a pressure of from 0.01 to 2000 psi, more preferably from 0.1 to 500 psi and a liquid hourly space velocity of from 0.5 $hr^{-1}$ to 100 $hr^{-1}$; isomerizing xylene feedstock components with reaction conditions including a temperature of from 230° C. to 510° C., a pressure of from 3 atmospheres to 35 atmospheres, a weight hourly space velocity of from 0.1 to 200 and a hydrogen/hydrocarbon mole ratio of from 0 to 100; disproportionating toluene with reaction conditions including a temperature of from 200° C. to 760° C., a pressure of from atmospheric to 60 atmospheres, and a weight hourly space velocity of from 0.08 to 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from 340° C. to 500° C., a pressure of from atmospheric to 200 atmospheres, a weight hourly space velocity of from 2 to 2000 and an aromatic hydrocarbon/alkylating agent mole ratio of from 1/1 to 20/1; and transalkylating aromatic hydrocarbons in the presence of polyalkylaromatic hydrocarbons with reaction conditions including a temperature of from 340° C. to 500° C., a pressure of from atmospheric to 200 atmospheres, a weight hourly space velocity of from 10 to 1000 and an aromatic hydrocarbon/alkylating agent mole ratio of from 1/1 to 6/1;

In a particularly preferred embodiment, the catalyst of the present invention is employed in the conversion of olefins by oligomerization to distillates. Such distillates are characterized by reduced methyl-branching of paraffinic components which is reflected in enhanced cetane number for such products. In addition, the use of such catalyst can minimize the amount of higher molecular weight oligomers (650° F.+) produced.

When olefins, e.g., propylene or butene, are oligomerized according to processes described herein, a mixture of liquid hydrocarbon products are formed. More particularly, this mixture of hydrocarbons may comprise at least 95% by weight of mono-olefin oligomers of the empirical formula

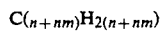

$$C_{(n+nm)}H_{2(n+nm)}$$

where n is 3 or 4 and m is an integer from 1 to 6, said mono-olefin oligomers comprising at least 20 percent by weight of olefins having at least 12 carbon atoms, said olefins having at least 12 carbon atoms having an average of from 0.80 to 2.00 methyl side groups per carbon chain, said olefins not having any side groups other than methyl.

It will be understood that methyl side groups are methyl groups which occupy positions other than the terminal positions of the first and last (i.e., alpha and omega) carbon atoms of the longest carbon chain. This longest carbon chain is also referred to herein as the straight backbone chain of the olefin. The average number of methyl side groups for the $C_{12}+$ olefins may comprise any range within the range of 0.80 to 2.00, e.g., from 0.80 to 1.90, e.g., from 0.80 to 1.80, e.g. from 0.80 to 1.70, e.g., from 0.80 to 1.60, e.g., from 0.80 to 1.50, e.g., from 0.80 to 1.40, e.g., from 0.80 to 1.30, etc.

These oligomers may be separated into fractions by conventional distillation separation. When propylene is oligomerized, olefin fractions containing predominantly the following numbers of carbon atoms can be obtained: 6, 9, 12, 15, 18 and 21. When butene is oligomerized, olefin fractions containing predominantly the following numbers of carbon atoms may be obtained: 8, 12, 16, 20, 24 and 28. It is also possible to oligomerize a mixture of propylene and butene and to obtain a mixture of oligomers having at least 6 carbon atoms.

EXAMPLE 1

11 g of silica-bound extrudate ZSM-23 (65 wt % ZSM-23, 35 wt % silica binder) were added to a solution of ammonia-borane ($NH_3{:}BH_3$, 1.5 g, dissolved in 20 g of distilled water). The contents were then agitated for ten minutes. The extrudate was then vacuum filtered on a Buchner funnel.

EXAMPLE 2

7 g of silica-bound extrudate ZSM-23 were added to a 0.49 molar solution of ammonia-borane ($NH_3{:}BH_3$, 0.3 g, dissolved in 20 g of distilled water). The contents were then agitated for ten minutes. The extrudate was then vacuum filtered on a Buchner funnel.

EXAMPLE 3

9.6 g of silica-bound extrudate ZSM-23 were added to a 0.09 molar solution of ammonia-borane ($NH_3{:}BH_3$, 0.054 g, dissolved in 20 g of distilled water). The contents were then agitated for ten minutes. The extrudate was then vacuum filtered on a Buchner funnel.

EXAMPLE 4

5 g of silica-bound extrudate ZSM-23 were added to a 0.258 molar solution of ammonia-borane ($NH_3{:}BH_3$, 0.2397 g, dissolved in 30 ml of distilled water). The contents were then agitated for ten minutes. The extrudate was then vacuum filtered on a Buchner funnel.

EXAMPLE 5

The products of Examples 1 to 4 were analyzed for boron, nitrogen, silicon and aluminum. The results are set forth below.

|  | Elemental Analysis, Wt % | | | |
|---|---|---|---|---|
|  | N | B | Si | Al |
| Example 1 | 0.66 | 0.56 | 40.62 | 0.46 |
| Example 2 | 0.64 | 0.42 | 43.51 | 0.46 |
| Example 3 | 0.15 | 0.076 | 31.90 | 0.32 |
| Example 4 | 0.48 | 0.44 | 43.95 | 0.60 |

The above samples have a B/N ratio of 1.1, 0.90, 0.70 and 1.2 respectively, showing that the stoichiometric B/N=1 ratio has largely been preserved after the treatment.

NMR

Boron ($^{11}B$ NMR) data show that complexes of the type $^+BH_2.NH_3$ or $BH_3.NH_3$ may exist at the zeolite surfaces after impregnation.

Thus, internal (or external) silanol sites of the zeolite or protonic sites of the zeolites (ion-exchange sites) may react with the hydridic hydrogens on the borane unit to liberate $H_2$ and leave, for example, the $^+BH_2{\cdot}NH_3$ unit at these sites. Upon calcination, the above functional unit decomposes to $(BNH)_x$ and BN materials. The products after thermal treatment still retain nitrogen.

EXAMPLE 6

The products of Examples 1-3 were thermally treated at 300° C. to effect the decomposition of ammonia borane to ceramic BN materials. The resulting product was contacted with a 60 wt % propene/40 wt % propane feed under oligomerization conditions. A similar run was carried out under the same conditions except that the catalyst employed was not treated with aqueous ammonia borane to deactivate the surface of the ZSM-23. The results are set forth as follows:

| Catalyst | (Av. methyls/$C_{12}$) | $C_3^=$ Conv. | Temp. (°C.) |
|---|---|---|---|
| ZSM-23 (untreated) | 1.93 | 93 | 160 |
| ZSM-23 (untreated) | 1.96 | 99 | 170 |
| ZSM-23 (untreated) | 1.87 | 70 | 155 |
| ZSM-23 (treated, Ex. 1) | 1.55 | 91 | 380 |
| ZSM-23 (treated, Ex. 2) | 1.60 | 87 | 360 |
| ZSM-23 (treated, Ex. 3) | 1.73 | 86 | 315 |

The BN treated ZSM-23 catalyst required higher temperatures to achieve equivalent conversion to the untreated ZSM-23 catalyst at the same WHSV (0.5). Nonetheless a dramatic change in selectivity resulted from using the treated catalyst as reflected by the reduced methyl branching of the product.

In other work with propylene oligomers as set out in the FIGURE, we have established that the cetane number of the 450°–650° F. diesel which resulted from saturating the propylene oligomers can be correlated quite well with their methyls/$C_{12}$. Once again, the end methyls of the $C_{12}$ backbone are not included, i.e., normal dodecane would have 0 methyls/$C_{12}$.

It is claimed:

1. A process of making a shape-selective catalyst comprising
    contacting acidic porous crystalline material with an aqueous solution of ammonia borane deactivating agent to effect deposition of said ammonia borane on the surface of said material; and
    exposing said material to thermal conditions which convert said ammonia borane to a ceramic having a boron to nitrogen bond.

2. The process of claim 1 wherein said acidic porous crystalline material is a crystalline silicate selected from the group consisting of ZSM-5, ZSM-11, ZSM-12, ZSM-22, ZSM-23, ZSM-35, and ZSM-48, said aqueous solution of ammonia borane deactivating material has an $NH_3.BH_3$ molar concentration of 0.005M to 10M and said thermal conditions comprise temperatures of 50° to 700° C.

3. The process of claim 1 wherein said acidic porous crystalline material comprises ZSM-23, said aqueous solution of ammonia borane deactivating material has an $NH_3.BH_3$ molar concentration of 0.005M to 10M and said thermal conditions comprise temperatures of 50° to 700° C.

4. The process of claim 1 wherein said acidic porous crystalline material is present in a catalyst composition which comprises 0 to 50 wt % of a matrix selected from the group consisting of silica, alumina, and silica-alumina.

5. The process of claim 3 wherein said acidic porous crystalline material is present in a catalyst composition which comprises 0 to 50 wt % of a silica matrix.

* * * * *